Figure 1:
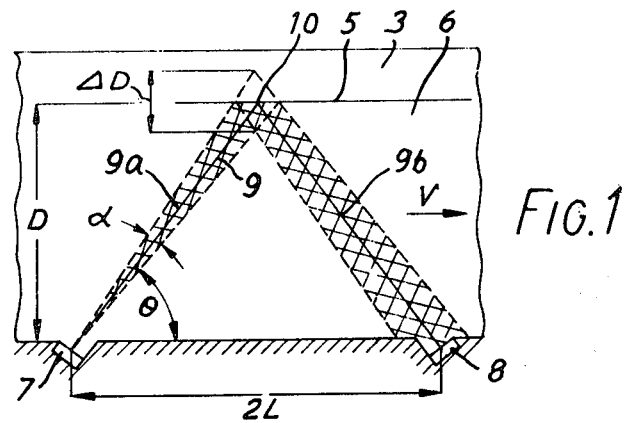

United States Patent [19]

Paulsen et al.

[11] 4,159,647
[45] Jul. 3, 1979

[54] APPARATUS FOR MEASURING THE FLOW QUANTITY OR ASSOCIATED PARAMETERS OF A LIQUID WITH TWO ULTRASONIC TRANSDUCERS

[75] Inventors: Mogens T. Paulsen; Bertel Birker, both of Sonderborg, Denmark

[73] Assignee: Danfoss A/S, Nordborg, Denmark

[21] Appl. No.: 870,991

[22] Filed: Jan. 20, 1978

[30] Foreign Application Priority Data

Jan. 28, 1977 [DE] Fed. Rep. of Germany ....... 2703439

[51] Int. Cl.$^2$ ............................................... G01F 1/66
[52] U.S. Cl. .................................. 73/194 A; 73/290 V
[58] Field of Search ........................... 73/194 A, 290 V

[56] References Cited

U.S. PATENT DOCUMENTS

| | | | |
|---|---|---|---|
| 3,546,935 | 12/1970 | Bruha | 73/194 A |
| 3,910,116 | 10/1975 | Smith | 73/290 V |
| 4,028,938 | 6/1977 | Eck | 73/194 A |

OTHER PUBLICATIONS

Suzuki et al. —"Ultrasonic Method of Flow Measurement in Large Conduits and Open Channels" 1972—pp. 129 –135.

Primary Examiner—Charles A. Ruehl
Attorney, Agent, or Firm—Wayne B. Easton

[57] ABSTRACT

The invention relates to ultrasonic apparatus for measuring flow quantities and related parameters of a liquid flowing with a free surface in a channel. Two transducers are mounted in longitudinally spaced relation to each other in the channel and below the level of the flowing liquid. The transducers are positioned and directed so that the effective measuring path therebetween is reflected from the underside of the liquid surface level and has components in the vertical direction and in the direction of flow. There is a measuring circuit for determining the transit times of the ultrasonic waves in both directions and an evaluating circuit for determining the desired quantities with regard to the transit times.

7 Claims, 8 Drawing Figures

APPARATUS FOR MEASURING THE FLOW QUANTITY OR ASSOCIATED PARAMETERS OF A LIQUID WITH TWO ULTRASONIC TRANSDUCERS

The invention relates to an apparatus for measuring the flow quantity or associated parameters such as the depth of liquid and mean flow speed of a liquid flowing with a free surface in a channel, comprising two ultrasonic transducers operating alternately as transmitter and receiver which, in plan, have a fixed spacing from each other and form between each other a measuring path with a component in the direction of flow, a measuring circuit which determines the transit times of the ultrasonic waves in both directions, and an evaluating circuit which determines the desired quantities with regard to these transit times.

As long as liquid flows through a pipe and fills its entire cross-section, it is sufficient to determine the mean flow speed to measure the quantity of flow. For this purpose, it is known to arrange two ultrasonic transducers at opposite sides of the pipe and staggered in the direction of flow, to operate them alternately as a transmitter and receiver, and to determine the downward and upward transit times. The mean flow speed is then proportional to the difference of the reciprocals of the two transit times. The measuring paths may be disposed in horizontal or vertical planes. To enable more effective consideration of the speed distribution in the pipe to be obtained, it is also possible to provide a plurality of juxtaposed parallel measuring paths and to summate their results under consideration of predetermined weight factors.

This principle can also be applied to open channels or pipes which are not entirely filled with liquid so that a free liquid surface is produced. However, a constant liquid level is a prerequisite for the accurate measurement of flow. In a known open channel in which four superposed measuring paths are provided, the exposed measuring path becomes ineffective on a drop in the liquid level; however, this does not provide accurate measurement of the depth of liquid such as is required for calculating the cross-section.

It is also known to measure the height of a liquid-filled vessel by arranging at the base of the vessel an ultrasonic transducer which emits an ultrasonic signal and receives same again after reflection at the liquid surface, the transit time of this signal being determined.

The invention is based on the problem of providing an apparatus of the aforementioned kind in which the liquid with a free surface flows in an open or closed channel requiring only one measuring path and with which, despite the variability in the height of the liquid level, one can measure not only the mean flow speed but also the depth of liquid i.e. the total throughput quantity.

This problem is solved according to the invention in that the measuring path also has a component in the vertical direction and contacts an impingement face (liquid surface, ultrasonic transducer) so that the inclination of the measuring path changes with the liquid level, and that the evaluating circuit determines a function of the angle of inclination with the aid of the sum of the reciprocals of both transit times and, with regard to this function, the desired quantities.

In this measuring apparatus the length and inclination of the measuring path are altered. This also changes the two transit times. By considering the sum of the reciprocals of both transit times, however, one can form a function of the angle of inclination or the length of the measuring path, with the aid of which one can on the one hand correct the length of the mean flow speed and on the other hand also determine the depth of liquid. However, if one knows the mean flow speed and the cross-section of the filled part of the channel depending on the depth of the liquid, one can accurately calculate the quantity of throughflow.

Desirably, the measuring path extends in a vertical plane having an angle of less than 45° to the direction of flow.

Preferably, the plane should be substantially parallel to the direction of flow. The smaller the angle, the larger will be the difference between the transit times and the more accurate will be the measuring result.

In one embodiment, the one ultrasonic transducer is arranged on a channel wall and the other ultrasonic transducer floats on the liquid but is harnessed horizontally. In particular, the floating ultrasonic transducer can be mounted on a vertical guide. In this case the measuring path consists of a single rectilinear section which changes its inclination depending on the liquid level.

In another embodiment, both ultrasonic converters are mounted on channel walls and are directed so that sound wave reflection occurs at the liquid surface. In this way one obtains longer measuring paths at little expense.

It has been found favourable for the or each ultrasonic transducer arranged on the channel wall to be staggered with respect to the lowest part of the channel. In this way the operation of the ultrasonic transducers is not influenced by the deposit of impurities that are often unavoidable in open channels. For example, the ultrasonic transducers can be arranged in oblique side walls of the channel.

The two ultrasonic transducers can in particular be combined as a unit insertable in the channel. This permits the subsequent installation. In addition, the spacing of the transducers is accurately defined. The unit should be made as streamlined body. It can be placed on the bottom of the channel. The ultrasonic transducers which are directed upwardly and arranged somewhat above the bottom of the channel will then practically not be subjected to the danger of soiling.

It is also recommendable if each ultrasonic converter emits a sound cone of which the aperture angle is selected so that the other ultrasonic transducer remains in the given operating range within the cone surface on a change in the liquid level. It is then not necessary for bringing the active faces of the ultrasonic transducers to the inclination of the measuring path; the ultrasonic transducers arranged on the channel walls can be built in at a fixed position.

As will hereinafter be explained in more detail, the function of the angle of inclination is preferably a cosine function. In the simplest case, namely with a measuring path extending in a plane parallel to the direction of flow, the evaluating circuit can as a result determine the mean flow speed v at a given projection L of half the measuring path on the flow direction and a given sound speed c from the downward transit time $t_1$ and the upward transit time $t_2$ according to the equation $$v = \frac{c^2}{L} \cdot \frac{\left(\frac{1}{t_1} - \frac{1}{t_2}\right)}{\left(\frac{1}{t_1} + \frac{1}{t_2}\right)^2}$$

and determine the depth D of liquid above an ultrasonic transducer according to the equation $$D = \sqrt{\frac{c^2}{\left(\frac{1}{t_1} + \frac{1}{t_2}\right)^2} - L^2}$$

If the measuring path extends in a plane inclined to the direction of flow, the cosine of the angle between this plane and the flow direction still has to be taken into consideration.

Figure 2:
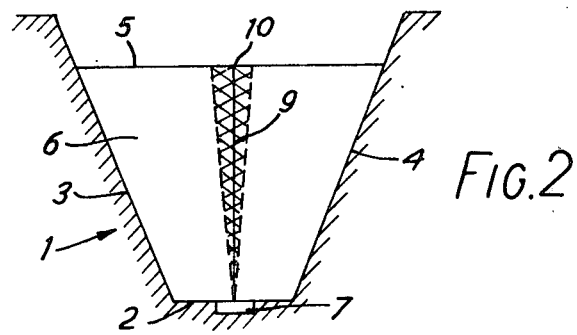
Figure 3:
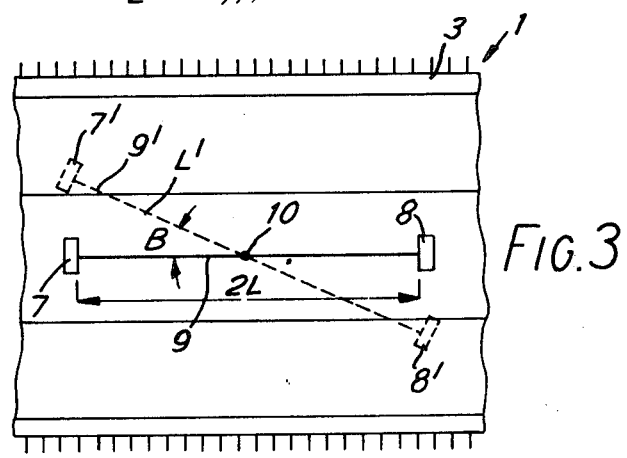
Figure 4:
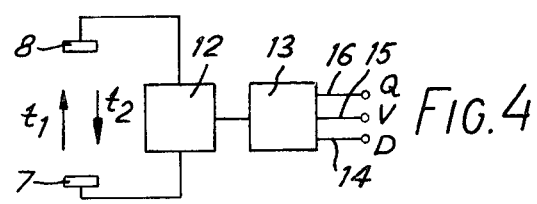
Figure 5:
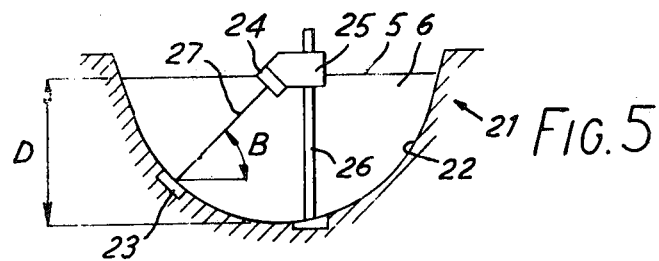
Figure 6:
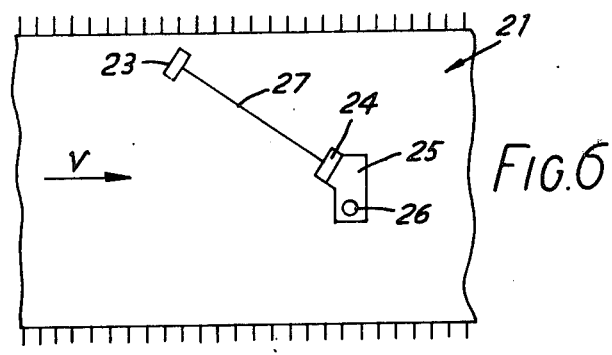
Figure 7:
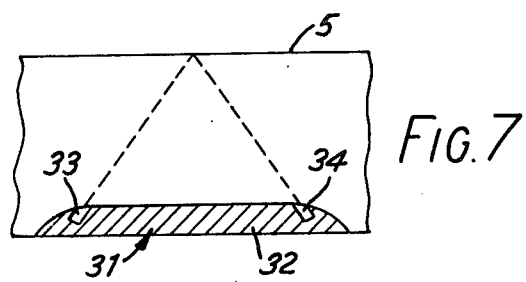
Figure 8:
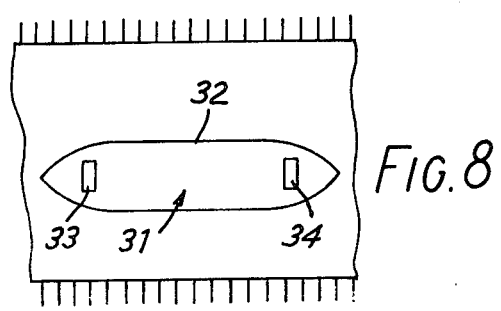

The invention will now be described in more detail with reference to examples diagrammatically illustrated in the drawing, wherein:

FIG. 1 is a longitudinal section through a channel with a measuring apparatus according to the invention;
FIG. 2 is a cross-section through the channel;
FIG. 3 is a plan view of the channel;
FIG. 4 is a diagrammatic block diagram;
FIG. 5 is a cross-section through a different embodiment;
FIG. 6 is a plan view of the FIG. 5 embodiment;
FIG. 7 is a cross-section through a further example, and
FIG. 8 is a plan view of the FIG. 7 embodiment.

A channel with a base wall or bottom 2 and two side walls 3 and 4 is filled with liquid 6 up to a level 5. The depth D of liquid can fluctuate within a range ΔD. The liquid-filled cross-section of the channel 1 is a function of this depth D of liquid. The liquid has a mean speed v. The throughflow quantity Q is calculated from the product of the mean speed and liquid cross-section.

In the bottom 2 there are arranged two ultrasonic transducers 7 and 8 which define between each other an ultrasonic measuring path 9 consisting of two rectilinear sections 9a and 9b. The sound waves are reflected at a point 10 on the surface 5 of the liquid. The spacing of the two ultrasonic transducers 7 and 8 in the direction of flow amounts to 2L. The length L is therefore equal to the projection of half the measuring path on the direction of flow. The measuring path extends in a vertical plane, in this case the medial plane of the channel, the sections being inclined at an angle θ to the horizontal. The sound emitted by each ultrasonic transducer is radiated in the shape of a cone having an aperture angle such that, within the range ΔD of height fluctuations of the liquid level 5, the respective other transducer still lies within the reflection space of this cone. As a consequence, the angle θ of inclination of the effective measuring path 9 changes depending on the level of the liquid surface 5. In FIG. 1 this is shown for the case where the ultrasonic transducer 7 serves as transmitter and the ultrasonic transducer 8 as receiver. The same applies conversely.

The two ultrasonic transducers 7 and 8 are alternately operated as transmitter and receiver, so that the sound signal moves alternately upstream and downstream. With the aid of a measuring circuit 12 an upward time $t_1$ and a downward time $t_2$ are measured. From these two times and other parameters such as the length L, the sound speed c in the liquid and the cross-sectional shape of the channel 1 one determines at least three physical quantities, namely the depth D of liquid at the output 14, the mean flow speed v at the output 15 and the flow quantity Q at the output 16.

From FIG. 1 it will be evident that $$t_1(c + v \cdot \cos \theta) = 2L/\cos \theta \tag{1}$$

$$t_2(c - v \cdot \cos \theta) = 2L/\cos \theta \tag{2}$$

$$D = L \cdot tg\theta \tag{3}$$

By adding or subtracting (1) and (2), one obtains $$c = \frac{L}{\cos \theta} \cdot \left(\frac{1}{t_1} + \frac{1}{t_2}\right) \tag{4}$$

$$v \cdot \cos \theta = \frac{L}{\cos \theta} \cdot \left(\frac{1}{t_1} - \frac{1}{t_2}\right) \tag{5}$$

If one converts (4) and (5) and substitutes (4) in (5), the result is $$v = \frac{c^2}{L} \cdot \frac{\left(\frac{1}{t_1} - \frac{1}{t_2}\right)}{\left(\frac{1}{t_1} + \frac{1}{t_2}\right)^2} \tag{6}$$

By means of the relationship $$tg \theta = \sqrt{\frac{1}{\cos^2 \theta} - 1} \tag{7}$$

and equations (3) and (4) one obtains $$D = \sqrt{\frac{c^2}{\left(\frac{1}{t_1} + \frac{1}{t_2}\right)^2} - L^2} \tag{8}$$

This also permits the throughflow quantity to be calculated in the above-mentioned form. Numerous possibilities are available for the computer circuits. The measuring circuit 12 advantageously operates so that the reciprocals of the transit times are represented as frequencies at which the sums and differences can be readily formed.

An alternative is shown in broken lines in FIG. 3, in which the ultrasonic transducers 7', 8' are arranged in the walls 3 and 4 of the channel 1. The measuring path 9' is then at an angle β to the direction of flow, amounting to about 25° in the embodiment. In this way one not only takes into account differences in the flow of speed occurring at different levels but also those differences occurring from one side of the channel to the other. It will be known that the liquid in a channel flows more slowly near the wall than it does in the middle. The ultrasonic transducers 7', 8' are therefore disposed somewhat above the bottom 2 so that their operability cannot be influenced by deposits of dirt particles.

In this procedure one still has to consider cos β which links the projection L' of half the measuring path 9' with the projection L of FIG. 1 by way of the equation $L' = L/\cos \beta$. With a similar calculation as above, one then obtains $$v = \frac{c^2 \cdot \cos \beta}{L} \cdot \frac{\left(\frac{1}{t_1} - \frac{1}{t_2}\right)}{\left(\frac{1}{t_1} + \frac{1}{t_2}\right)^2} \tag{9}$$

and $$D = \sqrt{\frac{c^2 \cdot \cos \beta}{\left(\frac{1}{t_1} + \frac{1}{t_2}\right)^2} - L^2} \tag{10}$$

In the embodiment of FIGS. 5 and 6, a channel 21 having a semi-circular wall 22 is provided. The liquid is again designated 6 and its level or surface is designated 5. An ultrasonic transducer 23 is disposed in the wall 22 displaced from the lowest part of the channel. A second ultrasonic transducer 24 is secured to a float 25 which can move up and down along a vertical guide 26. In plan, the two ultrasonic transducers 23 and 24 therefore have a fixed spacing from each other. The measuring part 27 between the two transducers forms with the horizontal an angle $\theta$ of inclination which, in turn, changes with the height of the liquid surface 5. The manner of operation is similar to the example of FIGS. 1 to 3 but without reflection of the sound waves. Numerous modifications are possible. For example, the measuring path can also be reflected at the wall of the channel or its bottom. Also, multiple reflections at the surface of the liquid and at the wall of the channel are possible.

FIGS. 7 and 8 illustrate a unit 31 formed as a body 32 with streamlined surface and combining two ultrasonic transducers 33 and 34. The unit lies on the bottom of the channel so that the measuring path has a point of reflection at the surface of the liquid. By means of this position the transducers are substantially protected from dirt deposits. The unit can be made so heavy by filling it with or forming it from concrete or the like that it retains its position under the weight. A useful length of the unit is for example 0.6 m.

We claim:

1. Apparatus for measuring the flow quantity or associated parameters such as depth of liquid and mean flow speed of a liquid flowing with a free surface in a channel, comprising, a channel through which a liquid is flowable, two ultrasonic transducers operable alternately with respect to each other as transmitter and receiver, said transducers being mounted in longitudinally spaced relation to each other in the defining wall of said channel below the intended surface level of the liquid, said transducers being mutually positioned and directed so that the effective measuring path therebetween is reflected from the underside of the liquid surface level and has components in the vertical direction and in the direction of flow, a measuring circuit for determining the transit times of the ultrasonic waves in both directions, an evaluating circuit for determining the desired quantities with regard to said transit times, and each said transducer emitting a sound cone with a sufficient aperture angle so that within the range of expected liquid level fluctuations the receiving transducer is still within the reflection space of the emitting sound cone.

2. Apparatus according to claim 1 wherein said measuring path extends in a vertical plane having an angle ($\beta$) of less than 45° to the direction of flow.

3. Apparatus according to claim 2 wherein said measuring path extends in a vertical plane substantially parallel to the direction of flow.

4. Apparatus according to claim 1 wherein said ultrasonic transducers are also in transversely spaced relation with respect to each other.

5. Apparatus according to claim 1 wherein said transducers have a common frame which is mounted in said channel as a unit.

6. Apparatus according to claim 1 wherein said evaluating circuit determines the mean flow speed v at a given projection L of half said measuring path on the flow direction and a given sound speed c from the downward transit time $t_1$ and the upward transit time $t_2$ according to the equation $$v = \frac{c^2}{L} \cdot \frac{\frac{1}{t_1} - \frac{1}{t_2}}{\left(\frac{1}{t_1} + \frac{1}{t_2}\right)^2}$$

7. Apparatus according to claim 1 wherein said evaluating circuit determines the depth D of liquid above an ultrasonic transducer at a given projection L of half said measuring path on the flow direction and a given sound speed c from the downward transit time $t_1$ and the upward transit time $t_2$ according to the equation $$D = \sqrt{\frac{c^2}{\left(\frac{1}{t_1} + \frac{1}{t_2}\right)^2} - L^2}$$

* * * * *